UNITED STATES PATENT OFFICE.

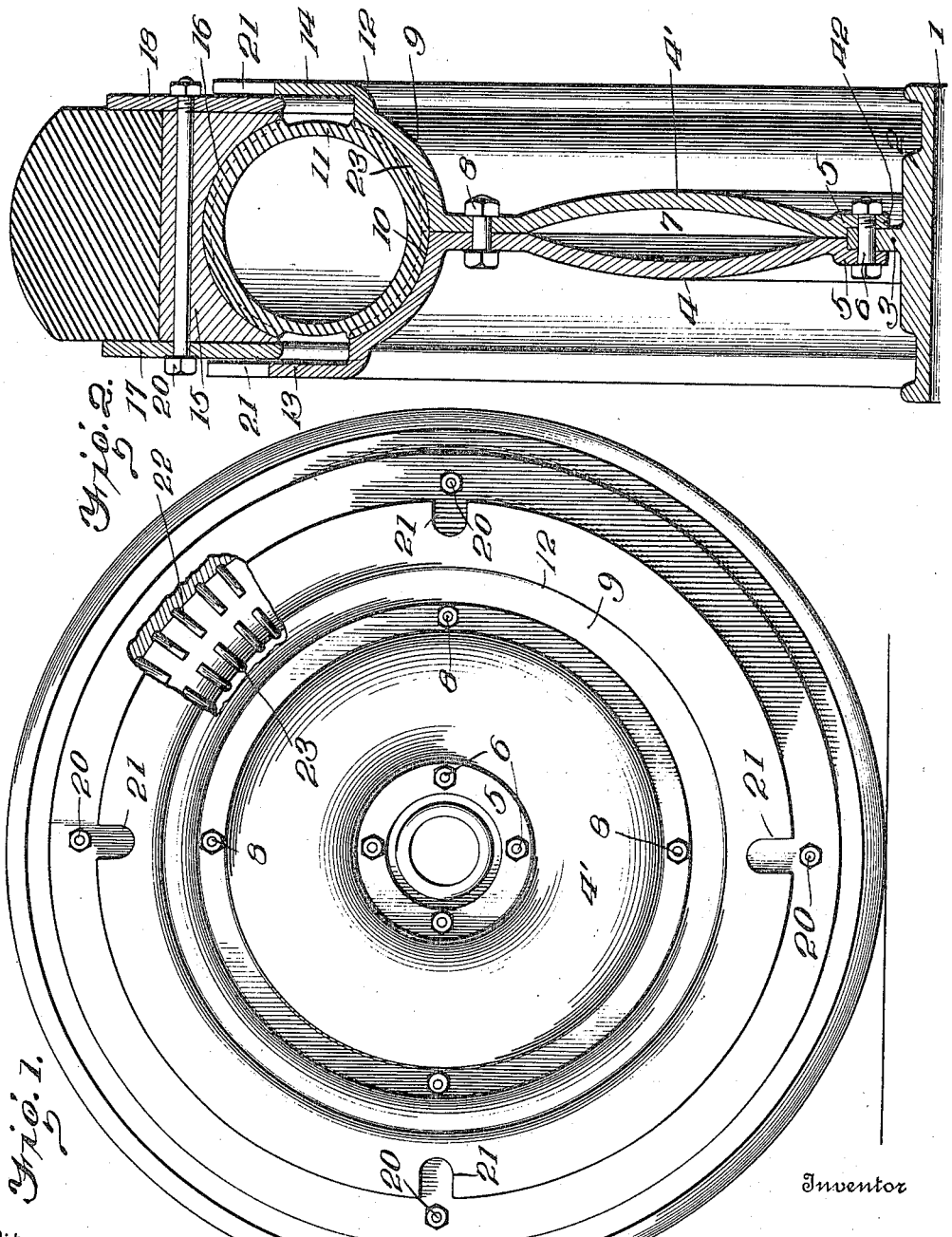

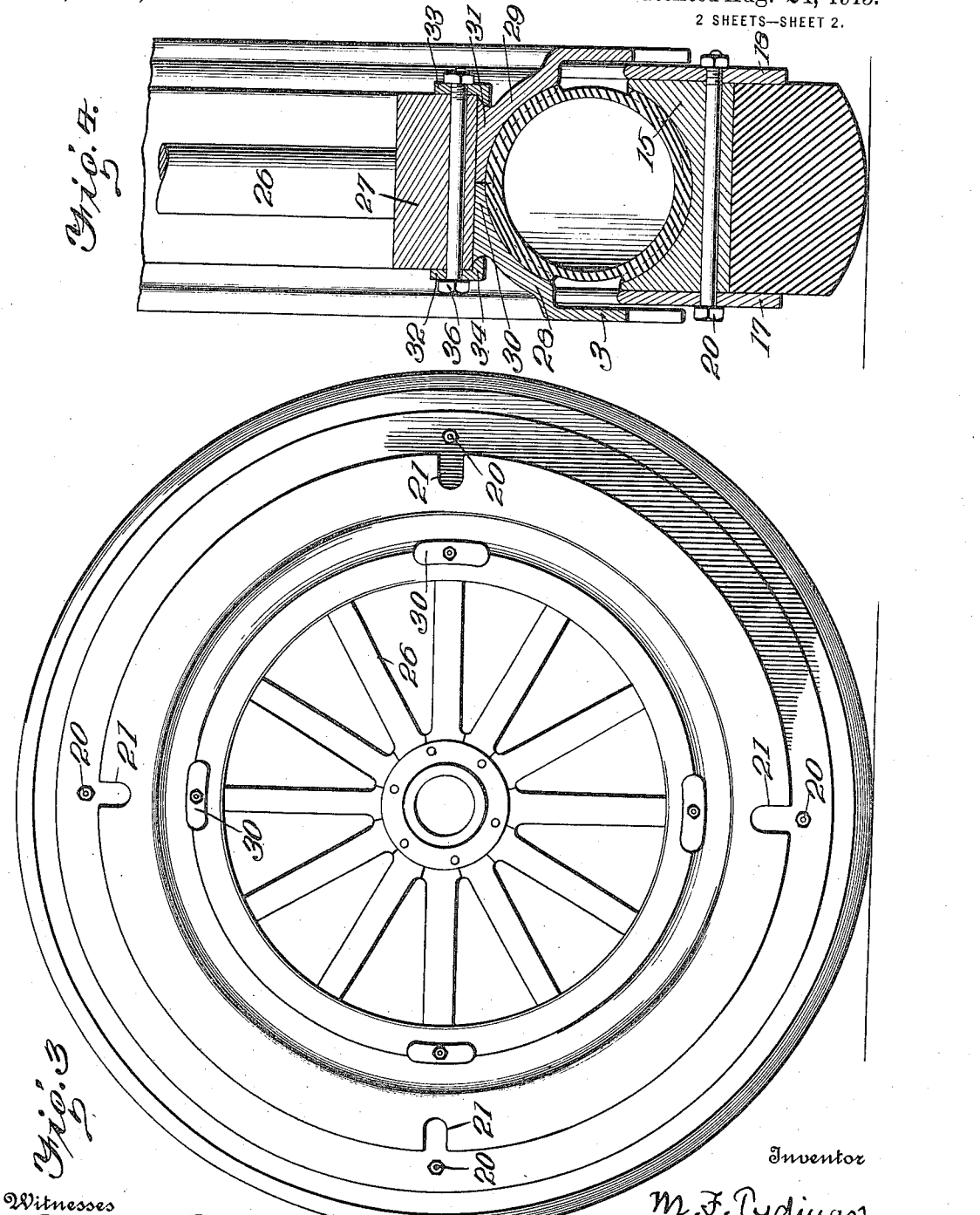

MILLARD FILLMORE TYDINGS, OF HAVRE DE GRACE, MARYLAND.

VEHICLE-WHEEL.

1,151,423.  Specification of Letters Patent. Patented Aug. 24, 1915.

Application filed July 16, 1913. Serial No. 779,375.

*To all whom it may concern:*

Be it known that I, MILLARD FILLMORE TYDINGS, a citizen of the United States, residing at Havre de Grace, in the county of Harford and State of Maryland, have invented certain new and useful Improvements in Vehicle-Wheels, of which the following is a specification.

My invention relates to improvements in wheels.

An object of my invention is to provide a vehicle wheel which has a pneumatic tube between the outer tread and the hub and so arranged and constructed that the tube cannot be punctured, yet providing means whereby a new tube can be easily replaced.

Another object of my improved wheel is to provide a vertical and circumferential movement of the tire, whereby I provide an easy running wheel adapted to take up all the shocks to which wheels of this character are subjected.

A still further object of my invention is to provide a strong, durable and more simple wheel of this character which is neater in appearance and having certain details of structure and combination of parts hereinafter more fully set forth.

In the accompanying drawings:—Figure 1, is a side elevation of a wheel embodying my invention partly broken away. Fig. 2, is a vertical transverse sectional view of a portion of Fig. 1. Fig. 3, is a side elevation of a modified form of wheel, and Fig. 4, is a vertical transverse sectional view of a portion of Fig. 3.

Referring now to the drawings, 1, represents the hub of my improved wheel which can be of any desired form and secured to the center of the hub on its outer periphery is a band 2, T shaped in cross section and having the stem 3, thereof extending outwardly as clearly shown in Fig. 2, of the drawings.

The wheel as shown in the preferred form, Figs. 1 and 2, is formed of two circular plates 4 and 4', having central openings 4² therein to receive the hub and have adjacent said openings the offset portions 5 to receive the stem of the band 2, and are bolted thereto by means of bolts 6. The said plates beyond the band, abut each other for a short distance and are bulged outwardly as indicated at 7. This bulged portion gives a certain amount of elasticity to the wheel. The plates 4 and 4' beyond the bulged portions abut each other and are bolted together by means of the bolts 8. These bolts 8, like the bolts 6, are arranged at intervals around the plates and are the desired distances apart to meet the requirements for which the wheels are adapted. The plates beyond the bolts are curved outwardly as indicated at 9, to form a semicircular portion 10, adapted to receive the inner tube 11. Beyond this semi circular portion the plates are offset as indicated at 12, and have the outwardly parallel straight portions 13 and 14, the purpose of which will be hereinafter more fully described.

Fitting within the parallel portions 13 and 14, is the rim or felly of the wheel, which consists of a heavy central portion 15, preferably made of wood and having its inner face 16 semi circular to fit the outer periphery of the pneumatic tube. Bolted to the sides 15 are the circular side plates 17 and 18, which pass on the inside of the parallel portions 13 and 14, of the wheel. These plates 17 and 18 extend beyond the portion 15 and form holding means for the solid rubber tire 19. These plates 17 and 18, are held in position by bolts 20, and the parallel portions 13 and 14 are provided with radial slots 21, opposite the bolts to allow the same to travel inwardly as clearly shown in Fig. 1, of the drawings. The offset portions at the bottom of the parallel plate form stops for the lower ends of the plates 17 and 18, to limit the inward movement thereof. The inner semi-circular face 16 of the member 15, is corrugated transversely thereof as indicated at 22, and the semi-circular portions of the plates 4 and 4', are likewise corrugated as indicated at 23. The pneumatic tube on its inner and outer faces is corrugated as indicated at 24, and 25, and adapted to interlock with the corrugations 22 and 23, whereby the outer felly and the tire are prevented from creeping on the inner central plates 4 and 4', yet giving it the proper longitudinal and radial movement.

By the structure here shown and described it will be seen that should a pneumatic tube blow out, the bolts 6 and 8 are released which allows one of the plates 4 or 4', to be removed so that the tube can be removed and replaced.

In the modification shown in Figs. 3 and 4, of the drawings, I provide the hub with the usual spokes 26 having a felly 27 and the plates 28 and 29 are provided with flat portions 30 and 31, resting against the outer periphery of the felly and abutting each other. On each side of the felly is a circular plate 32 and 33. These plates are provided with inwardly turned edges 34, adapted to engage the curved portions 35 of the plates 28 and 29, and lock the same against outward movement. These plates 32 and 33 are held against movement on the felly by means of the bolts 36 and thus clamp the plates 28 and 29 in their proper position to form the semi-circular portion for the pneumatic tube the same as that shown in the preferred form. The remainder of the tire beyond the pneumatic tube is precisely the same in Figs. 3 and 4, as in Figs. 1 and 2.

From the foregoing description it will be seen that the outer tire when depressed by the weight of the vehicle, compresses the pneumatic tire on one side and moves away from the tube on the opposite or upper side, the plates carried by the outer felly or tire being guided by the straight portion of the plates 28 and 29.

It is evident that various modifications and changes might be resorted to in the mechanical expression of my invention illustrated without departing from the spirit and scope of the invention and hence I do not wish to limit myself to the exact disclosure hereof.

What I claim is;—

1. A vehicle wheel comprising, a hub having an exterior projection, a pair of annular plates receiving said hub and at their inner edge portions bolted to said projection, the circumferential portions of said plates being offset in opposite directions to form an annular trough or rim concentric with said hub and annular shoulders and parallel outwardly projecting annular guide walls at opposite sides of said trough, the outer edge portions of said plates being bolted together adjacent to the floor of said trough, said plates being dished outwardly in opposite directions between said bolts at their inner edge portions and said bolts at their outer edge portions, a felly arranged between said guide walls and provided with a tire, and a cushioning support arranged in said trough.

2. A vehicle wheel comprising a circumferential rim having annular inner shoulders and guide walls arranged outwardly beyond said shoulders, cushioning means arranged in said rim, an annular felly seated on said means, a tire removably fitted on the periphery of said felly, side plates secured to said felly and facing the opposite sides thereof and projecting outwardly therefrom at the opposite edges of the tire to removably confine said tire on said felly, said plates being interposed between the side faces of the felly and said guide walls and slidably engaging the inner faces of said walls and at their inner edges adapted to abut said shoulders, and clamping bolts passing transversely through the felly and said side plates and removably clamping the side plates to the felly, said walls having recesses adapted to receive the ends of said bolts projecting beyond said plates, substantially as described.

3. A vehicle wheel comprising a trough-like rim composed of a pair of meeting plates offset laterally in opposite directions and terminating in outwardly projecting approximately flat guide walls having spaced radial notches opening outwardly through their outer edges, an annular cushioning body seated on said floor of the rim, an annular felly seated on said body and having a concaved inner face receiving the same, a tire exteriorly surrounding and seated on said felly, a pair of flat opposite side plates at the opposite sides of the tire and felly and slidably engaging the inner faces of said guide walls and interposed between the same and the side faces of the felly, and transverse securing devices projecting laterally from and carried by said felly and removably clamping said side plates thereto and projecting laterally beyond the outer faces thereof in radial alinement with said notches, said projecting portions of said devices arranged to move into and from said notches during the relative vertical movements of the felly and the rim, substantially as described.

In testimony whereof I affix my signature in presence of two witnesses.

MILLARD FILLMORE TYDINGS.

Witnesses:
R. E. RIMMEY,
CHARLES CHARSHEE.